United States Patent Office 2,749,890
Patented June 12, 1956

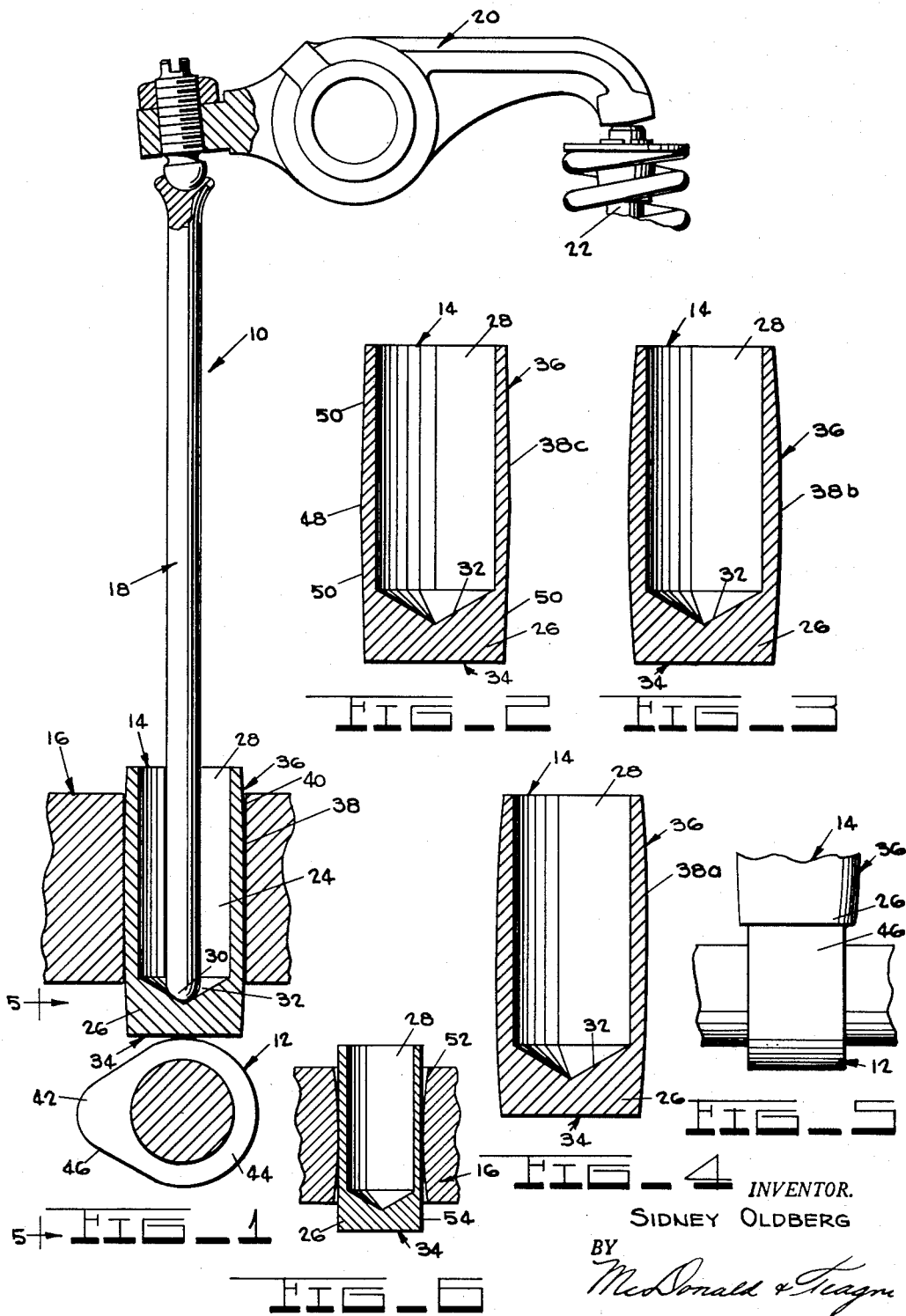

2,749,890

MOTION TRANSMITTING MECHANISM

Sidney Oldberg, Birmingham, Mich., assignor to Eaton Manufacturing Company, Cleveland, Ohio, a corporation of Ohio Application June 14, 1952, Serial No. 293,543

19 Claims. (Cl. 123—90)

This invention relates to reciprocable self-aligning structures and more particularly as incorporated in tappet mechanisms of engine valve gear systems.

Broadly the invention comprehends the provision of a reciprocable element and a supporting guide therefor wherein the related surfaces of the element and guide are of such form as to permit of the relative angular displacement of the axis of the element to the axis of the guide and thus assure mating surface alignment between an end planar surface of the element and a surface of an actuator engageable with the planar surface of the element. This structural embodiment finds practical application in the valve gear system of an internal combustion engine wherein the tappet as a reciprocable element in a tappet guide has a planar surface thereof engaged by a mating surface of a rotatable cam serving as the reciprocable actuating means for the tappet.

Although numerous ways of providing for mating surface alignment between the engageable surfaces of a cam and tappet have been promulgated none have proved entirely feasible or economical. It is felt that the present means of assuring this mating surface alignment is a definite solution to the problem.

Among the several objects of the invention are the provision of a self-aligning reciprocable element and guide structure permitting of line contact engagement between a planar surface of the element and an actuator therefor, that:

1. Is simple and economical to make;
2. Provides for an even distribution of loading and wear between the engaging surfaces of the element and actuator;
3. Provides for a smooth reciprocable and tilting movement of the element in the guide therefor;
4. Utilizes a convex peripheral surface axially of the length of the element or guide having engagement on a true cylindrical surface of its associated guide or element;
5. Includes a peripheral axially convex surface on one or the other of the element or guide permitting of angular displacement of the axes one to the other, and wherein the cross-section of the surface is in the form of a conic curve such as a hyperbola, parabola or ellipse or other shape capable of fulfilling the desired results;
6. Is adaptable to application in valve gear systems as the tappet, tappet guide and cam thereof.

Other objects and advantages of the invention will appear from the following description taken in connection with the drawings forming a part of the specification, and in which:

Fig. 1 is a side elevation partly broken away and partly cross-sectionalized view of an engine valve gear system embodying the invention;

Figs. 2 through 4 illustrate modified forms of the tappet from that shown by Fig. 1;

Fig. 5 is a view looking substantially in the direction of lines 5—5 of Fig. 1; and Fig. 6 is a cross-sectional view of a modified tappet and tappet guide structure from that of Fig. 1.

Similar reference characters indicate corresponding parts throughout the several views of the drawings.

As a means of assuring a tappet and tappet guide structure for internal combustion engine valve gear systems that is both economical and practical and capable of prolonging tappet life through increasing the load carrying capacity of the cam engaged surface thereof it has been proposed to use surfaces on either the peripheral surface of the tappet or guide which are axially convex whereby the tappet can tilt or have its axis angularly displaced relative to the axis of the guide bore as well as be axially relatively reciprocable without interference. The convexity of the tappet or guide surface can assume any of several shapes such as the curve of a hyperbola, parabola, and ellipse, combined circular and straight lines, and a circular arc. The conic sections—hyperbola, parabola and ellipse forms of convex section are preferable since they provide a rolling contact between the tappet and guide as angular displacement occurs therebetween, while at the same time necessitating a minimum of increased clearance when tilting to permit the tappet to accommodate misalignment between the engaging tappet and cam surfaces.

Referring to the drawings for more specific details of the invention, 10 represents generally an internal combustion engine valve gear system comprising basically a rotatable cam 12, a tappet 14, a tappet guide 16, a pushrod 18, a rocker arm 20, and a valve 22.

The tappet 14 constituting the major motion transmitting element between the cam and valve, includes a hollow main body portion 24 closed at one end 26 and open at its other end 28. The pushrod 18 projects into the hollow of the body portion 24 through the open end 28 thereof and seats one spherical end 30 thereof in a socket 32 provided internally of the body portion 24 on the closed end thereof. Whereas the external surface of the closed end of the tappet, constituting the cam engaged surface 34 of the tappet, lies in a plane perpendicular to the axis thereof, the external peripheral surface 36 of the tappet body is convex axially of its length with the convexity being substantially uniform throughout a path of revolution about the axis of the tappet, the purpose of which will hereinafter appear.

The axial convexity of the tappet body can be made of any of several curves or shapes such as a hyperbolic curve 38 represented by Fig. 1, a parabolic curve 38a by Fig. 4, a true radius curve 38b by Fig. 3, and a combined central circular and end angular shape 38c by Fig. 2. In each instance of the tappets of Figs. 1 through 4, the cam engaged surfaces thereof lie in a plane perpendicular to the axes thereof whereas the external peripheral surfaces of the tappet are concentric to the axes thereof throughout their axial length. Furthermore the tappets of Figs. 1 through 4 are each adapted to be mounted for reciprocation in a cylindrical walled bore 40 of guide 16, the purpose of which will hereinafter appear.

Cam 12 is of conventional design and as such includes ramp and base circle portions 42 and 44 respectively presenting a tappet engaging surface 46 which follows a path of revolution about the axis of the cam which is substantially parallel thereto.

Tappet 14 as viewed in Figs. 1 and 5 is free not only to be reciprocated in guide 16 and also within predetermined limits to tilt or rotate about a point within the axial limits of the guide 16 and in a plane fixed by the cam and tappet axes. As such the axis of the tappet is angularly displaced relative to the axis of the guide bore. Because of the permissible tilting of the tappet, the tappet can adjust itself relative to the pushrod, tappet guide and cam so as to compensate primarily for misalignment between the mating surfaces of the cam and tappet and thus provide for full line contact therebetween, as shown by Fig. 5. In so providing full line contact the load carrying capacity of the cam and tappet mating surfaces is increased whereby prolonged life thereof is obtained.

In addition to the cam and tappet mating surface alignment provided, the external peripheral surface form of the tappet is such that preferably a rolling contact is provided between the tappet peripheral surface and surface of the guide bore wall wherein through the engagement of the surface of the ramp portion of cam 12 with the cam engaging surface of the tappet at locations offset to one side of the axis of the tappet, a reverse movement occurs tending to cock the tappet causing an impact between the tappet peripheral surface and wall of the bore. Through the use of any of the three conic sections, hyperbola, parabola and ellipse, a minimum of increased clearance is necessary between the wall of the guide bore and the maximum diameter of the tappet, to permit of the tilting of the tappet with a positive rolling contact to accommodate misalignment without introducing noise, which might otherwise occur, as the cocking movement of the tappet is reversed, if rolling contact were not provided.

Whereas the hyperbolic, parabolic and true radius curve forms represented by Figs. 1, 4 and 3 respectively form the convex curvature of these tappets, the circular central segment 48 of convex shape 38c is an arc of a sphere and the angular segments 50 are sides of a cone, that is the tappet of Fig. 2 is composed of a central spherical portion and a pair of end truncated cone portions.

In the utilization of a tappet and a guide having associated spherical surfaces of the kind hereinbefore defined and as specifically illustrated in Fig. 1 wherein motion is transmitted by way of the tappet from the cam to the pushrod a translation from rotation to lineal reciprocation is effected. Through the provision of a flat cam contacting surface 34 on the tappet engageable by a flat surface 46 on the cam and wherein the tappet is tiltable to accommodate for any tolerance discrepancy between right angular arrangement of the axes of the tappet guide (axial line of reciprocation of the tappet), the mating surfaces of the tappet and cam can assume and maintain full line contact relation for all phases of relative movement between the cam and tappet. This assurance of line contact provides for lower unit pressure and uniform distribution thereof between the mating tappet and cam surfaces thereby affording prolonged useful life thereof.

Fig. 6 illustrates a modified arrangement from that of Fig. 1 in that a peripheral surface 52 of axial convexity is provided on the wall of the guide bore instead of the tappet body and wherein the peripheral surface 54 of the tappet body is a true cylinder. The axial convexity of surface 52 can be any of the conic sections, true radius or any shape which will permit of relative reciprocation and tilting between the tappet and guide. This structure as likened to the structure of Fig. 1 will permit of a like achievement thereto.

Although the inventive concept hereof has been applied specifically to valve gear systems, it is readily conceivable that it has application to other power transmitting trains wherein motion is to be transmitted reciprocably through at least one of the members of the train and requirement for surface engagement alignment is essential. Furthermore although certain specific form shapes and curves have been illustrated and described as applied to the specifically illustrated tappet and guide, any curve or shape relation between a reciprocable member and a guide therefor as evidenced in principle hereby is deemed as coming within the scope of this invention. Accordingly, the invention is to be limited by the appended claims.

What I claim is:

1. Motion transmitting mechanism comprising a reciprocable member having a planar surface on one end thereof perpendicular to the axis of the member, a stationary guide member having a bore for reciprocation of the reciprocable member therein, said members having associated peripheral surfaces, one of which is convex axially of its length and the other of which is cylindrical, and a movable fixed axis member having a straight line surface engageable with the planar surface of the reciprocable member.

2. Mechanism according to claim 1 wherein the convexity of the peripheral surface of the one member is a portion of a conic section.

3. Mechanism according to claim 1 wherein the fixed axis member is rotatable about said fixed axis and said axis is substantially perpendicular to the axis of the guide bore.

4. Internal combustion engine valve gear mechanism comprising a stationary guide having a bore therethrough, and a tappet supported for reciprocation in the guide bore, the tappet and wall of the guide bore having associated peripheral surfaces, one surface of which is convex axially of its length and the other of which is cylindrical.

5. Mechanism according to claim 4 wherein the tappet has a planar surface on one axial extremity thereof and wherein a cam is provided having an axis of rotation substantially perpendicular to the axis of the guide bore and a peripheral surface engageable with the planar surface of the tappet, said peripheral surface of the cam being substantially parallel to the axis of the cam throughout the revolution thereof.

6. Mechanism according to claim 4 wherein the surface convex axially of its length is formed from a central spherical section and opposite end truncated cone sections.

7. Mechanism according to claim 4 wherein the surface convex axially of its length is formed from a radius having its center disposed outside of the tappet.

8. Mechanism according to claim 4 wherein the surface convex axially of its length is on the tappet.

9. Mechanism according to claim 4 wherein the surface convex axially of its length is a portion of a conic section.

10. Mechanism according to claim 9 wherein the conic section is a parabola.

11. Mechanism according to claim 9 wherein the conic section is a hyperbola.

12. Mechanism according to claim 11 wherein the hyperbola section is on the tappet.

13. Mechanism according to claim 11 wherein the parabola section is on the tappet.

14. Internal combustion engine valve gear mechanism comprising a stationary guide having a bore therethrough, a tappet supported for reciprocation in the guide bore having a flat surface on one axial extremity thereof lying perpendicular to the axis thereof, a cam rotatable about an axis substantially perpendicular to the guide bore having a peripheral surface parallel to the axis thereof engageable with the flat surface on the tappet, and a pushrod having one end thereof engageable with the tappet axially oppositely disposed to the engagement of the cam with the tappet, the tappet and wall of the guide bore having associated peripheral surfaces, one surface of which is convex axially of its length and the other of which is cylindrical.

15. An engine tappet having a flat surface on one end thereof lying in a plane perpendicular to the axis of the tappet and a peripheral surface which is convex axially of the length of the tappet.

16. An engine tappet having a flat surface on one end thereof lying in a plane perpendicular to the axis of the tappet and a peripheral surface lying in a substantially uniform path of movement about the axis thereof, said surface being convex axially of the length of the tappet.

17. A tappet according to claim 16 wherein the surface convex axially of the length of the tappet is a conic section.

18. A tappet according to claim 17 wherein the conic section is a hyperbola.

19. An engine tappet having a cam engaging surface on one end thereof and a peripheral surface lying in a substantially uniform path of movement about the axis thereof, said surface being convex axially of the length of the tappet.

References Cited in the file of this patent

FOREIGN PATENTS

| | | |
|---|---|---|
| 529,885 | Great Britain | Nov. 29, 1940 |
| 225,228 | Switzerland | Apr. 16, 1943 |